(12) United States Patent
Yanagi et al.

(10) Patent No.: US 6,168,078 B1
(45) Date of Patent: Jan. 2, 2001

(54) CARD READER

(75) Inventors: Ryouichi Yanagi; Yoshio Hiramoto; Izumi Asoh; Masashi Kato, all of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/026,805

(22) Filed: Feb. 20, 1998

(30) Foreign Application Priority Data

Jul. 31, 1997 (JP) .................................................... 9-206941

(51) Int. Cl.$^7$ ...................................................... G06K 5/00
(52) U.S. Cl. .............................................. 235/380; 705/41
(58) Field of Search .................................... 235/380, 492, 235/382, 375, 389, 487; 707/1–10; 705/26, 35, 41, 42, 43, 44

(56) References Cited

U.S. PATENT DOCUMENTS

| | | | |
|---|---|---|---|
| 4,827,111 | * 5/1989 | Kondo | 235/380 |
| 4,891,506 | * 1/1990 | Yoshimatsu | 235/492 |
| 4,983,816 | * 1/1991 | Iijima | 235/379 |
| 4,985,615 | * 1/1991 | Iijima | 235/492 |
| 5,097,118 | * 3/1992 | Iijima | 235/492 |
| 5,226,155 | * 7/1993 | Iijima | 395/600 |
| 5,384,454 | * 1/1995 | Iijima | 235/492 |
| 5,473,690 | * 12/1995 | Grimonprez et al. | 380/24 |
| 5,477,510 | * 12/1995 | Ukita | 369/18 |
| 5,517,014 | * 5/1996 | Iijima | 235/492 |
| 5,630,167 | * 5/1997 | Hosokawa | 395/823 |
| 5,828,053 | * 10/1998 | Kinugasa | 235/492 |
| 5,929,428 | * 7/1999 | Iijima | 235/492 |

FOREIGN PATENT DOCUMENTS

| | | |
|---|---|---|
| 196 29 085 | 1/1998 | (DE) . |
| 0 838 789 | 4/1998 | (EP) . |
| 94/19777 | 9/1994 | (WO) . |
| 97/00500 | 1/1997 | (WO) . |

* cited by examiner

Primary Examiner—Thien M. Le
(74) Attorney, Agent, or Firm—Armstrong, Westerman, Hattori, McLeland & Naughton

(57) ABSTRACT

A card reader reads data from a card which stores data in a plurality of files, and includes an input part including at least one key for inputting an instruction, and a data processor. The data processor successively outputs data of at least one of the files stored in the card depending on a key operation of the input part.

14 Claims, 11 Drawing Sheets

CARD READER

BACKGROUND OF THE INVENTION

The present invention generally relates to card readers, and more particularly to a card reader which can read data of files stored in a card.

Various cards having the function of storing data have been proposed, and recently, much attention is drawn to integrated circuit (IC) cards which include a processor such as a central processing unit (CPU) and a memory. Such an IC card is inserted into a card reader, and a reference can be made to the data of a file stored in the IC card by making a key operation. If a process is carried out with respect to the referred data, the data is updated depending on a result of the process.

FIG. 1 is a flow chart for explaining the operation of an example of a conventional card reader. In FIG. 1, when an IC card is inserted into a card reader in a step ST1, a step ST2 displays most recent data of a file which is presently used, out of a plurality of files stored in the IC card, in response to a data reference request which is generated by operating an operation panel. The IC card is extracted from the card reader in a step ST3. A step ST4 decides whether or not another data reference request generated from the operation panel exists, and the process ends if the decision result in the step ST4 is NO.

On the other hand, if the decision result in the step ST4 is YES, a step ST5 makes preparations for starting an access by a system (application) which carries out a process with respect to the data which is to be referred to and belongs to a desired file.

After the step ST5, the process returns to the step ST1. Hence, the application described above makes a reference to the data of the desired file stored in the IC card which is inserted into the card reader, and the referred data is displayed in the step ST2.

Accordingly, in the conventional card reader, there was a problem in that it is only possible to make a reference to the data of the file which is stored in the IC card and is presently being used. For this reason, in a case where a reference is to be next made to data of another file after referring to the data of the file which is presently being used, it was necessary to start an application which processes the data of this other file to be referred next.

On the other hand, because the conventional card reader can only make a reference to the data of the file which is stored in the IC card and is presently being used, there was also a problem in that it is impossible to simply display the data of all of the files stored in the IC card.

SUMMARY OF THE INVENTION

Accordingly, it is a general object of the present invention to provide a novel and useful card reader in which the problems described above are eliminated.

Another and more specific object of the present invention is to provide a card reader which can simply output not only data of a file which is presently being used but also other files stored in a card such as an IC card, without having to start an application for processing the data of each file, and is capable of outputting most recent data of all of the files stored in the card if necessary in response to a simple operation.

Still another object of the present invention is to provide a card reader for reading data from a card which stores data in a plurality of files, comprising an input part including at least one key for inputting an instruction, and a data processor successively outputting data of at least one of the files stored in the card depending on a key operation of the input part. According to the card reader of the present invention, it is possible to simply output not only data of a file which is presently being used but also other files stored in a card, without having to start an application for processing the data of each file, and is capable of outputting most recent data of all of the files stored in the card if necessary in response to a simple operation.

A further object of the present invention is to provide a card reader for reading data from a card which stores data in a plurality of files, comprising a data processor successively outputting data of at least one of the files stored in the card when the card is inserted into the card reader. According to the card reader of the present invention, it is possible to simply output not only data of a file which is presently being used but also other files stored in a card, without having to start an application for processing the data of each file, and is capable of outputting most recent data of all of the files stored in the card if necessary in response to a simple operation.

Another object of the present invention is to provide a card reader for reading data from a card which stores data in a plurality of files, comprising a key, a data processor accessing one of the files stored in the card at a time, and reading data from the file which is accessed, and a display displaying the data read by the data processor from the card, wherein the data processor switches the file to be accessed from one to another when the key is operated. According to the card reader of the present invention, it is possible to simply output not only data of a file which is presently being used but also other files stored in a card, without having to start an application for processing the data of each file, and is capable of outputting most recent data of all of the files stored in the card if necessary in response to a simple operation.

Other objects and further features of the present invention will be apparent from the following detailed description when read in conjunction with the accompanying drawings.

DESCRIPTION OF THE PREFERRED EMBODIMENTS

Figure 1:
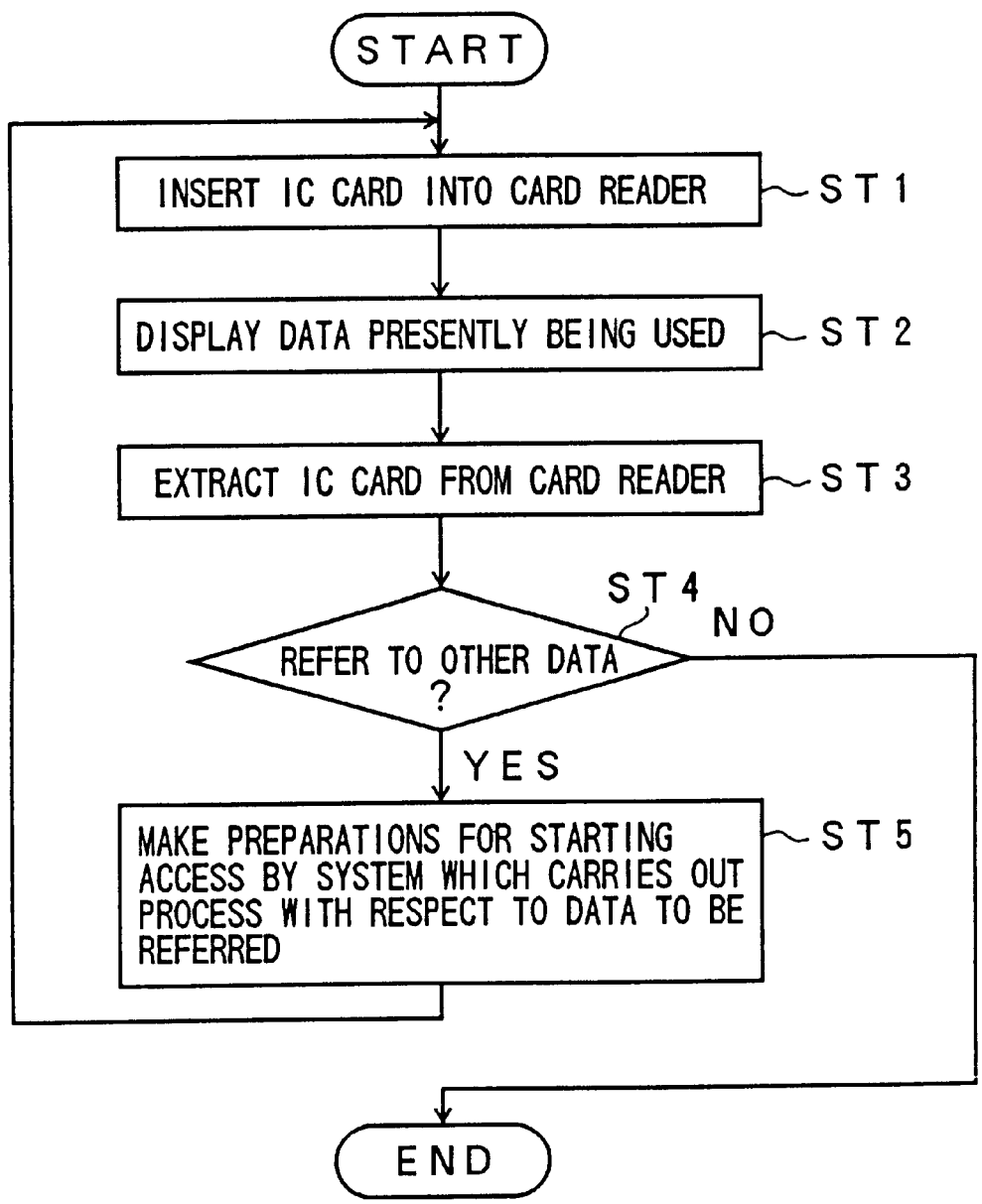
FIG. 1 is a flow chart for explaining the operation of an example of a conventional card reader.
Figure 2:
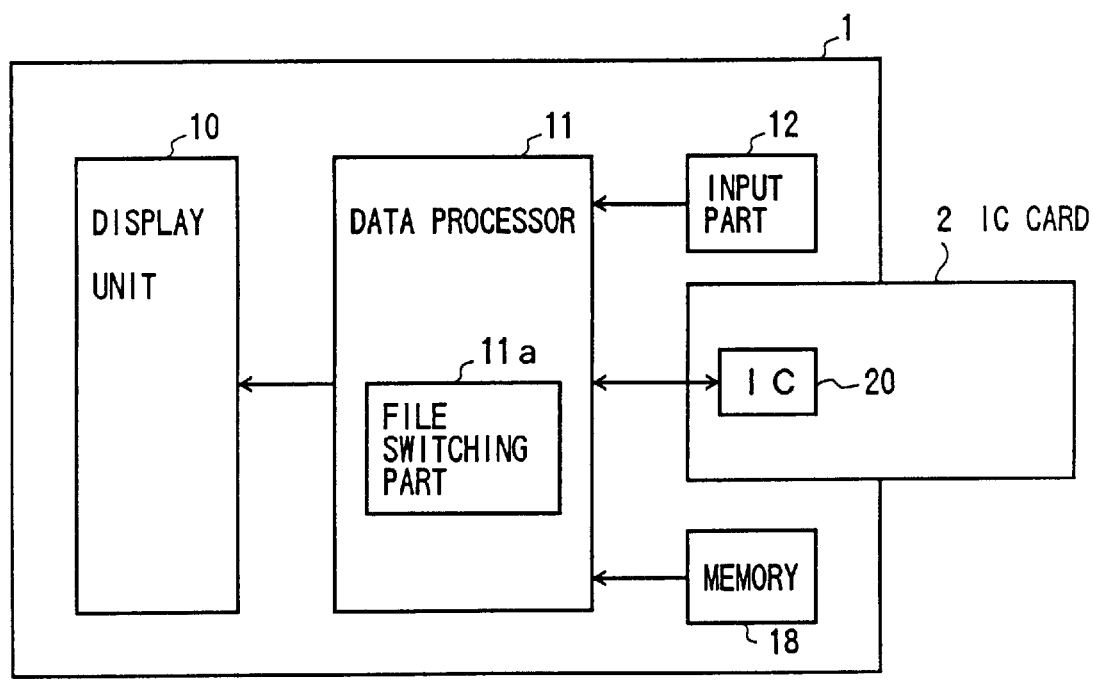
FIG. 2 is a system block diagram showing an embodiment of a card reader according to the present invention.

FIG. 2 is a system block diagram showing an embodiment of a card reader according to the present invention. In this embodiment, the present invention is applied to an IC card.

In FIG. 2, a card reader 1 generally includes a display unit 10, a data processor 11, an input part 12, and a memory 18. The input part 12 includes a plurality of keys, and an instruction input by making a key operation from the input part 12 is supplied to the data processor 11. The keys of the input part 12 include a ten-key, a reference key which will be described later and the like. When an IC card 2 is inserted into the card reader 1, the data processor 11 reads data of a file which is specified from the input part 12, and carries out a process which is specified from the input part 12 with respect to the read data. The memory 18 stores the data of the file read from the IC card 2, a history of the read file and the like. The process itself which is carried out with respect to the data read from the IC card 2 is not directly related to the subject matter of the present invention, and a description thereof will be omitted. The IC card 2 has a known construction in conformance with the standards of ISO7816, for example, and an IC 20 within the IC card 2 is provided with a CPU, a memory for storing data of a plurality of files and the like. The data of the file processed by the data processor 11 is supplied to and displayed on the display unit 10.

The data processor 11 includes a file switching part 11a. This file switching part 11a switches the data of the file which is stored within the IC card 2 and is to be supplied to the display unit 10, in response to an instruction from the input part 12. In other words, the file switching part 11a of the data processor 11 can successively output and display on the display unit 10 the most recent data of each file stored in the IC card 2 in response to a key operation made from the input part 12.

Figure 3:
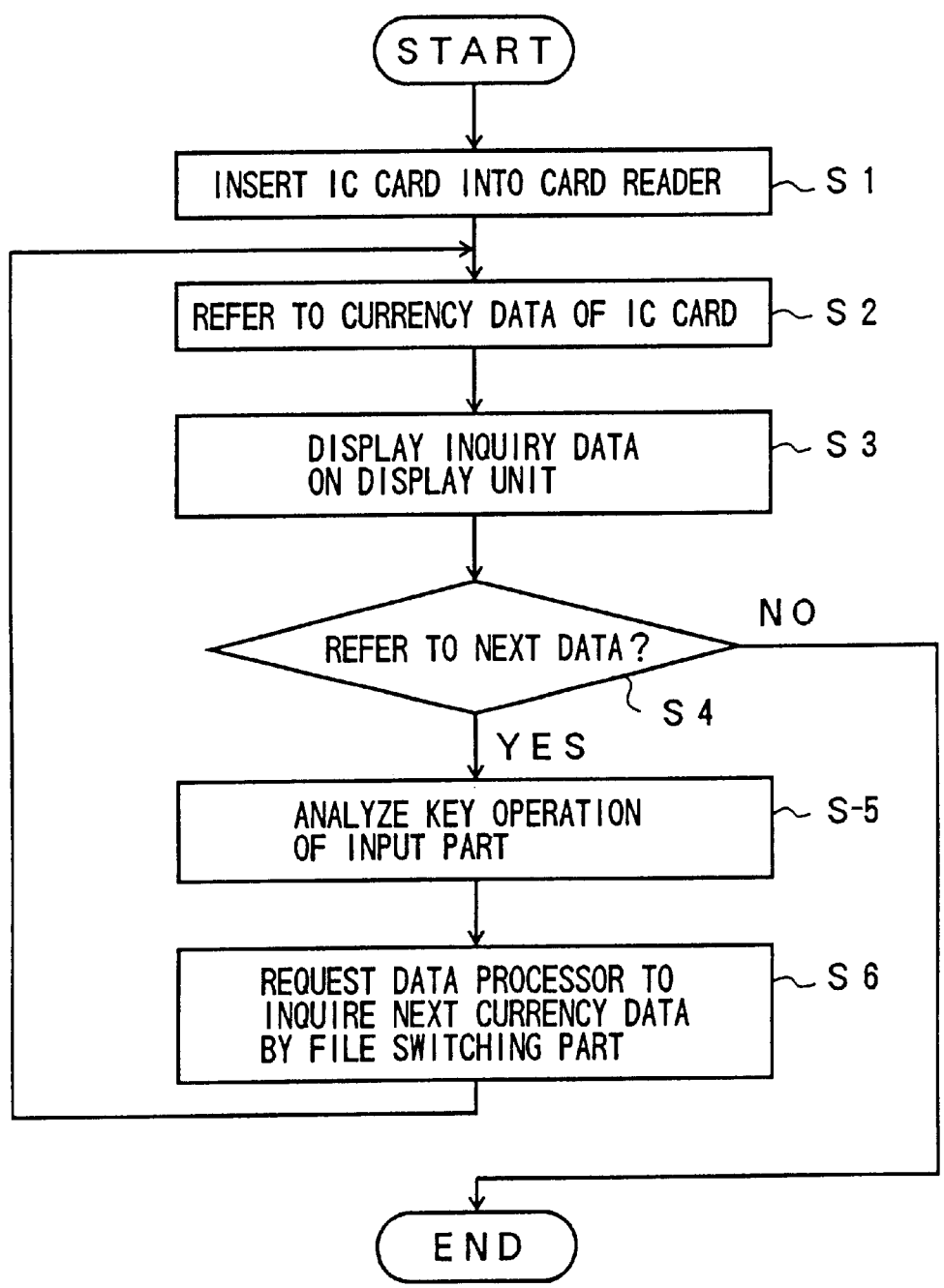
FIG. 3 is a flow chart for generally explaining a file selection process of a data processor.

FIG. 3 is a flow chart for generally explaining a file selection process of the data processor 11. For the sake of convenience, it is assumed in this embodiment that the files stored in the IC card 2 include currency files (hereinafter referred to as "electronic money files") which include currency data of each of various countries.

Figure 4:
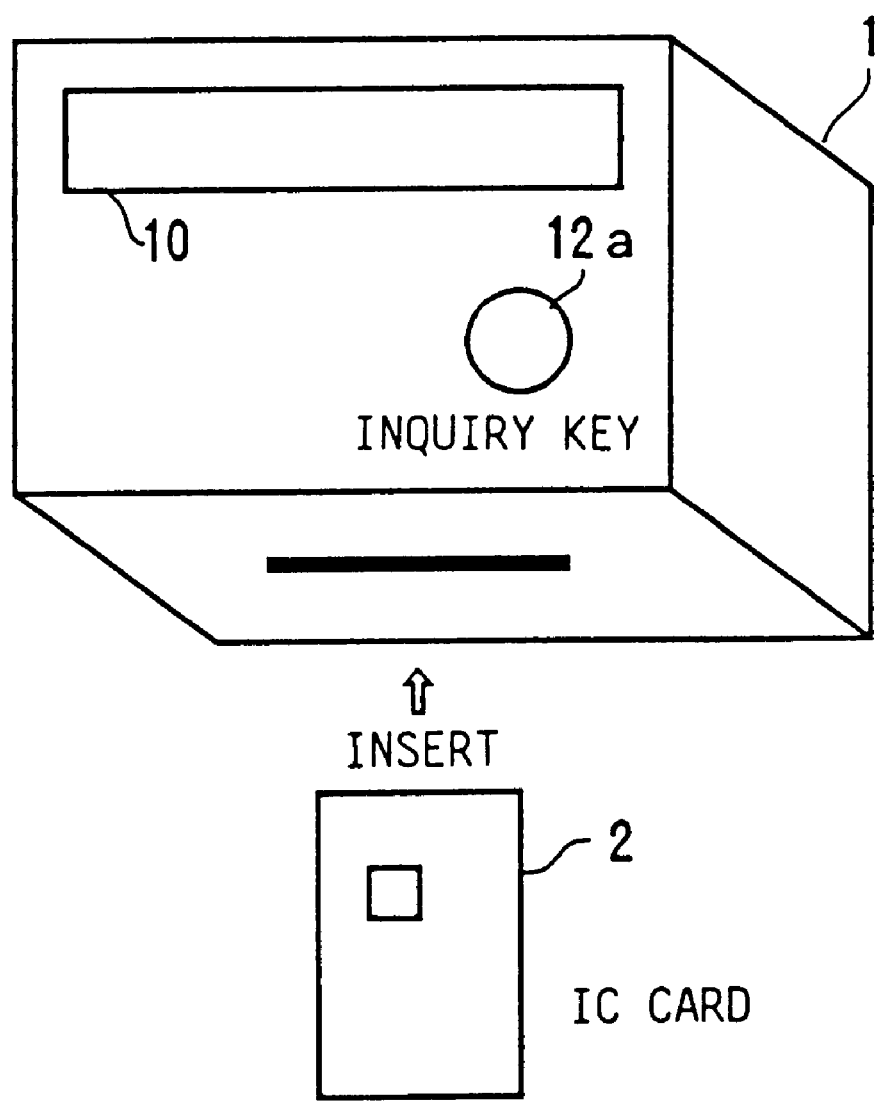
FIG. 4 is a perspective view for explaining the operation of the card reader.
Figure 5:
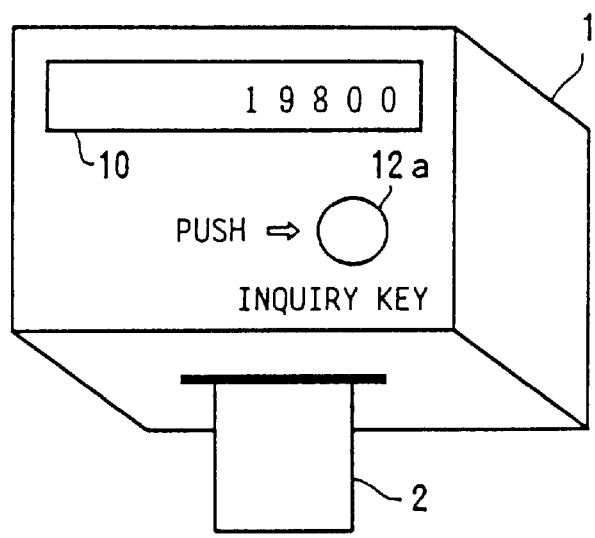
FIG. 5 is a perspective view for explaining the operation of the card reader.

In FIG. 3, when the IC card 2 is inserted into the card reader 1 in a step S1 as shown in FIG. 4, a step S2 selects one of the plurality of electronic money files stored in the IC card 2 in response to a key operation made from the input part 12, and makes a reference to the currency data of the selected electronic money file. In addition, in a case where an electronic money file which is stored in the IC card 2 and is to be accessed first by an inquiry process is preset to an electronic money file related to the currency of the country in which the card reader 1 is set up, for example, the step S2 automatically selects the electronic money file related to the currency of the preset country out of the plurality of electronic money files stored in the IC card 2, and makes a reference to the currency data of the selected electronic money file. A step S3 supplies the referred currency data to the display unit 10, and the currency data is displayed on the display unit 10 as shown in FIG. 5. In this case, the currency data displayed on the display unit 10 is "19800".

Figure 6:
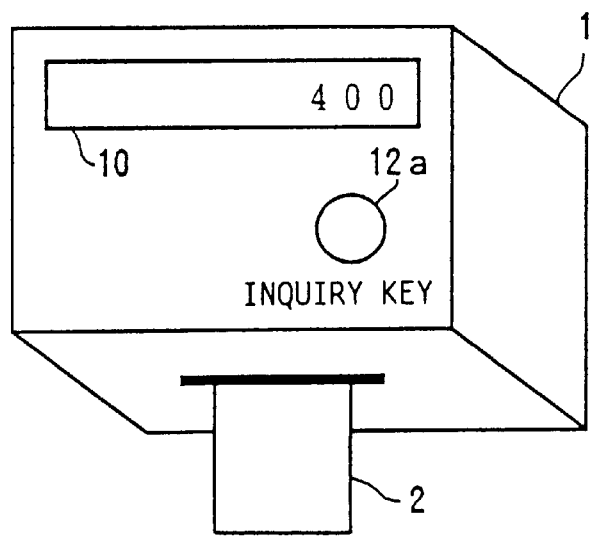
FIG. 6 is a perspective view for explaining the operation of the card reader.

A step S4 decides whether or not a reference is to be made to the currency data of a next electronic money file, based on whether or not a next key operation is made from the input part 12 within a predetermined time from the previous key operation. The process ends if the decision result in the step S4 is NO. On the other hand, if the decision result in the step S4 is YES, a step S5 analyzes the key operation made from the input part 12. For example, if an inquiry key 12a of the input part 12 shown in FIG. 5 is pushed within a predetermined time from the previous key operation made from the input part 12 in the step S2, the decision result in the step S4 becomes YES, and the step S5 in this case judged that the inquiry key 12a is pushed. Hence, a step S6 switches the electronic money file to which the reference is to be made to the next electronic money file by the file switching part 11a, and makes an inquiry request for the currency data of the next electronic money file to the data processor 11. After the step S6, the process returns to the step S2, and the step S2 this time makes reference to the currency data of the next electronic money file. As a result, the step S3 displays the currency data "400" of the next electronic money file on the display unit 10 as shown in FIG. 6, for example.

Next, a description will be given of the usage of the IC card 2 which stores a plurality of electronic money files. In the case of the IC card 2 which stores the electronic money files, each electronic money file is a currency file of each country, and the currency data of each electronic money file corresponds to the funds of the owner of the IC card 2 in the currency of each country. When using such an IC card 2 to purchase an article in a certain country, the owner of the IC card 2 inputs an identification number or the like of the owner from a point-of-sales (POS) terminal so as to confirm authorized use of the IC card 2. Thereafter, the currency data of the electronic money file stored in the IC card 2 and corresponding to the certain country is updated by reducing the currency data by an amount to be paid for the article in the currency of the certain country. In other word, when the IC card 2 is used to purchase an article, a predetermined process is carried out with respect to the currency data of the electronic money file which is read from the IC card 2, and the currency data is updated depending on a result of the predetermined process. However, this predetermined process itself is not directly related to the subject matter of the present invention, and a description and illustration thereof will be omitted in FIG. 3 and FIG. 7 and FIGS. 10 through 13 which will be described later. The inquiry process is carried out before the purchase is made in order to confirm the remaining funds in the currency of the certain country, and after the purchase is made in order to confirm the funds remaining in the currency of the certain country after the purchase is made, for example. When confirming the funds in the present invention, it is not only possible to confirm the funds in the currency which is presently being used, but also the funds in the other currencies, by making a simple key operation.

Of course, the key of the input part 12 that is operated when displaying the currency data of the next electronic money file is not limited to the inquiry key 12a. In addition, it is possible to construct the card reader 1 to automatically and successively display all of the most recent data of each of the electronic money files stored in the IC card 2 in response to one key operation or, to automatically and successively display the most recent data of each of the electronic money files stored in the IC card 2 every time one key is operated. Further, it is possible to construct the card reader 1 to automatically display the most recent data of the electronic money file that is used last out of the electronic money files stored in the IC card 2, in response to an operation of a predetermined key. It is possible to know the electronic money file that is used last from a history of the files which is read from the IC card 2 and is stored in the memory 18 of the card reader 1.

Figure 7:
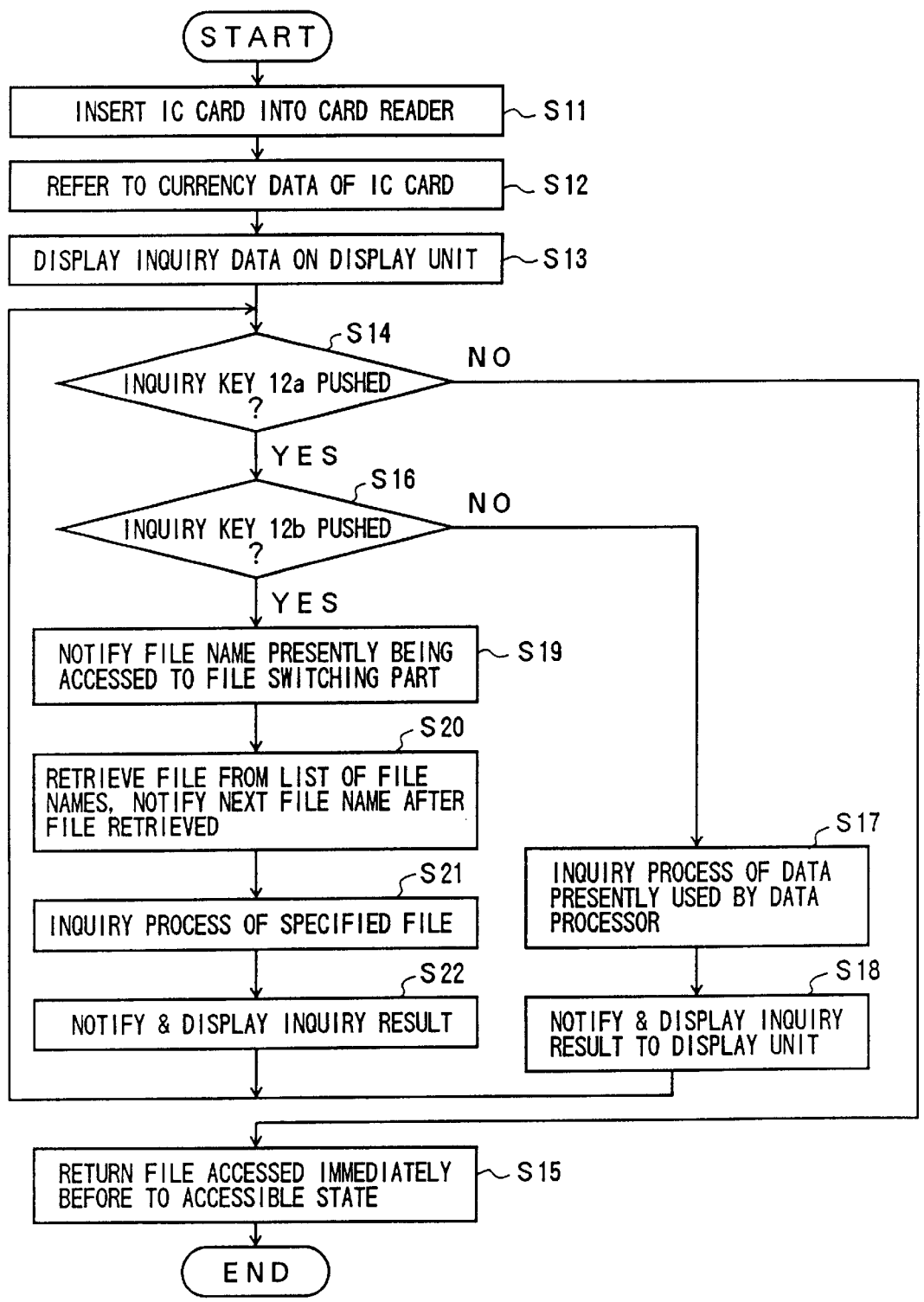
FIG. 7 is a flow chart for explaining a first embodiment of the file selection process.

Next, a description will be given of a first embodiment of the file selection process of the data processor 11, by referring to FIG. 7. FIG. 7 is a flow chart for explaining this first embodiment of the file selection process.

In this embodiment, it is assumed for the sake of convenience that the input part 12 is provided with a ten-key 120 and two inquiry keys 12a and 12b. The inquiry key 12a is pushed when displaying the data of the file which is presently being accessed, and the inquiry key 12b is pushed when displaying the data of the next file which is next to the file which is presently being accessed. Each of the keys of the input part 12 may take the form of buttons or, keys of a touch-key-panel.

In FIG. 7, when the IC card 2 is inserted into the card reader 1 in a step S11, a step S12 selects one of the plurality of files stored in the IC card 2 depending on a key operation made from the input part 12 or depending on a setting which is made in advance, and makes a reference to the data of the selected file. A step S13 supplies the data of the selected tile to the display unit 10, and displays the data on the display unit 10.

A step S14 decides whether or not the inquiry key 12a of the input part 12 is pushed within a predetermined time. If the decision result in the step S14 is NO, a step S15 returns a file to a state accessible from the data processor 11 if an access to this file is made immediately before, based on the history stored in the memory 18, and the process ends.

On the other hand, if the decision result in the step S14 is YES, a step S16 decides whether or not the inquiry key 12b is pushed within a predetermined time. If the decision result in the step S16 is NO, a step S17 carries out an inquiry process with respect to the data which has been subjected to the predetermined process and is presently being used by the data processor 11. In addition, a step S18 supplies the data which is obtained as a result of the inquiry process made in the step S17 to the display unit 10, and the process returns to the step S14.

Figures 8, 9:
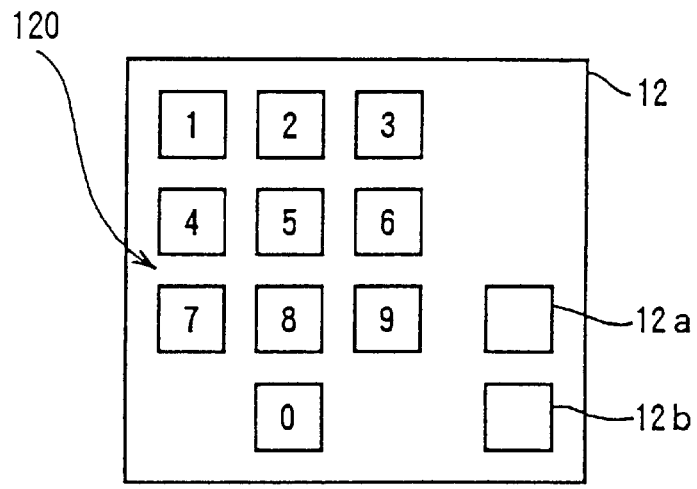
FIG. 8 is a plan view showing an embodiment of an input part.
FIG. 9 is a diagram showing the structure of files stored in an IC card.

If the decision result in the step S16 is YES, a step S19 notifies a file name of the file which is presently being accessed to the file switching part 11a. FIG. 9 is a diagram showing the structure of the files stored in the IC card 2. In a case where the files shown in FIG. 9 are electronic money files, each electronic money file includes currency data of a corresponding country. For example, it is assumed for the sake of convenience that the file which is presently being accessed is a file "MF/DF01/DF11/ File02" having a file name "2". A step S20 retrieves the file "MF/DF01/DF11/ File02" which is presently being accessed from a list of file names, and notifies a file name "3" of a file "MF/DF01/ DF12/ File03" which is next to the file "MF/DF01/DF11/ File02" to the file switching part 11a. A step S21 carries out an inquiry process with respect to the file "MF/DF01/DF12/ File03" having the file name "3" that is notified to the file switching part 11a. In addition, a step S22 supplies the data obtained as a result of the inquiry process in the step S21 to the display unit 10, and the process returns to the step S14.

Figure 10:
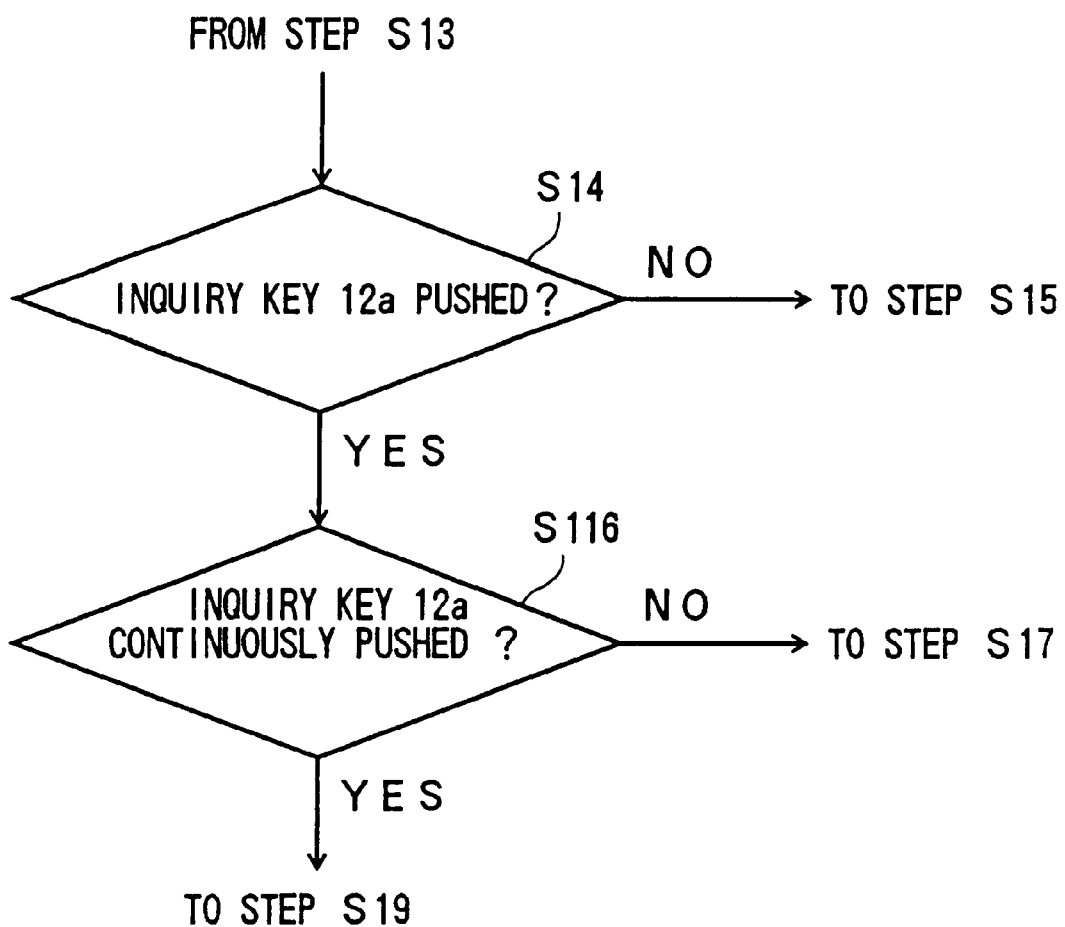
FIG. 10 is a flow chart for explaining a second embodiment of the file selection process.

FIG. 10 is a flow chart for explaining a second embodiment of the file selection process. In FIG. 10, those steps which are the same as those corresponding steps in FIG. 7 are designated by the same reference numerals, and a description thereof will be omitted. In this embodiment, no inquiry key 12b is provided, and the input part 12 is only provided with a single inquiry key 12a. Hence, a decision is made to determined whether or not the inquiry key 12a is continuously operated within a predetermined time. More particularly, if the inquiry key 12a is pushed only once, the decision result in the step S14 becomes YES, the decision result in a step S116 becomes NO, and the process advances to the step S17. In addition, if the inquiry key 12a is pushed within a predetermined time from the time when the inquiry key 12a is first pushed, the decision result in the step S14 becomes YES, the decision result in the step S116 becomes YES, and the process advances to the step S19. Therefore, a first push of the inquiry key 12a becomes a first inquiry request, and a second push of the inquiry key 12a within the predetermined time from the first push becomes an inquiry file switching request to the file switching part 11a. Preferably, the data processor 11 carries out a timer management with respect to timings and intervals of the pushing of the inquiry key 12a, and judges an end of the operation depending on the time for which the inquiry key 12a is not pushed.

Figure 11:
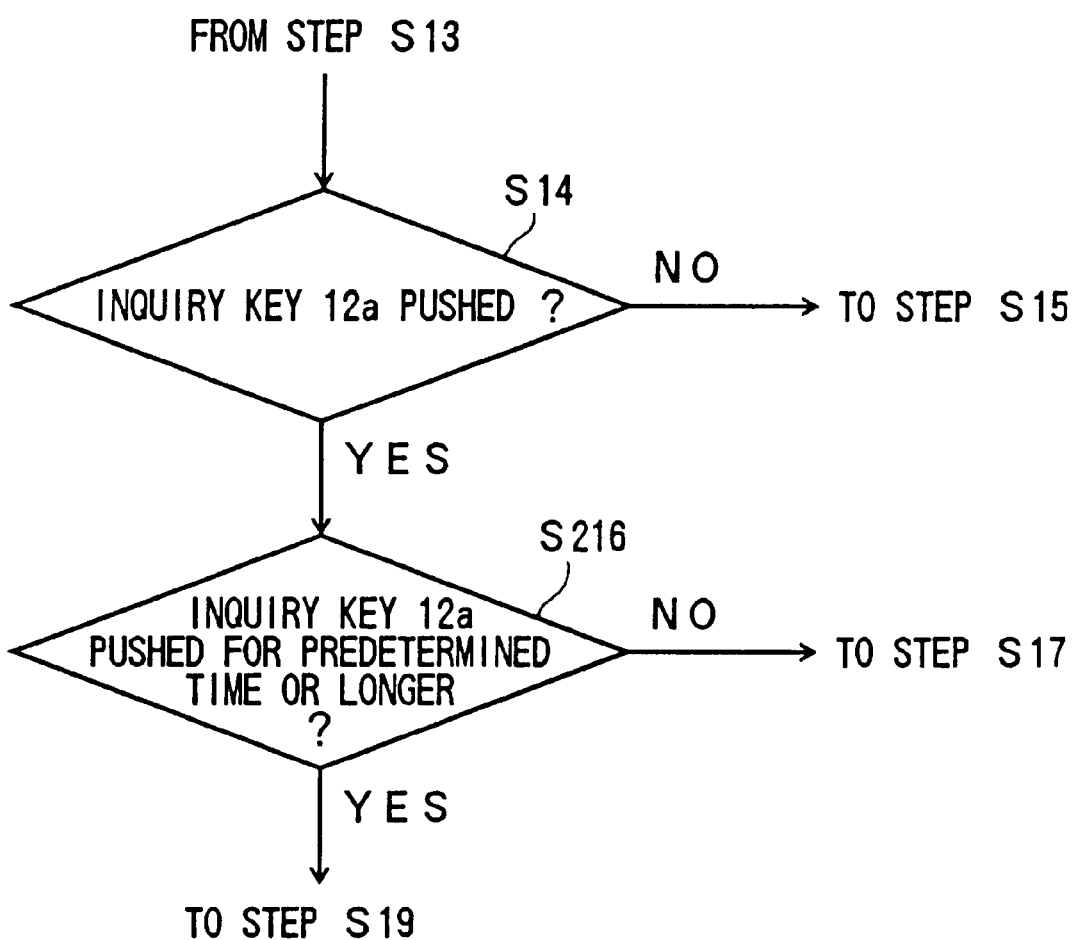
FIG. 11 is a flow chart for explaining a third embodiment of the file selection process.

FIG. 11 is a flow chart for explaining a third embodiment of the file selection process. In FIG. 11, those steps which are the same as those corresponding steps in FIG. 7 are designated by the same reference numerals, and a description thereof will be omitted. In this embodiment, only a single inquiry key 12a is provided in the input part 12, and the inquiry request and the inquiry file switching request are discriminated based on the time for which the inquiry key 12a is pushed. In this case, a step S216 decides whether or not the inquiry key 12a is pushed for a predetermined time. If the inquiry key 12a is pushed for a time less than the predetermined time, the decision result in the step S14 is YES and the decision result in the step S216 is NO, and the process advances to the step S17. On the other hand, if the inquiry key 12a is pushed for the predetermined time or longer, the decision result in the step S14 is YES and the decision result in the step S216 is YES, and the process advances to the step S19. Therefore, the pushing of the inquiry key 12a for a time less than the predetermined time becomes a first inquiry request, and the pushing of the inquiry key 12a for the predetermined time or longer becomes the inquiry file switching request to the file switching part 11a.

Figure 12:
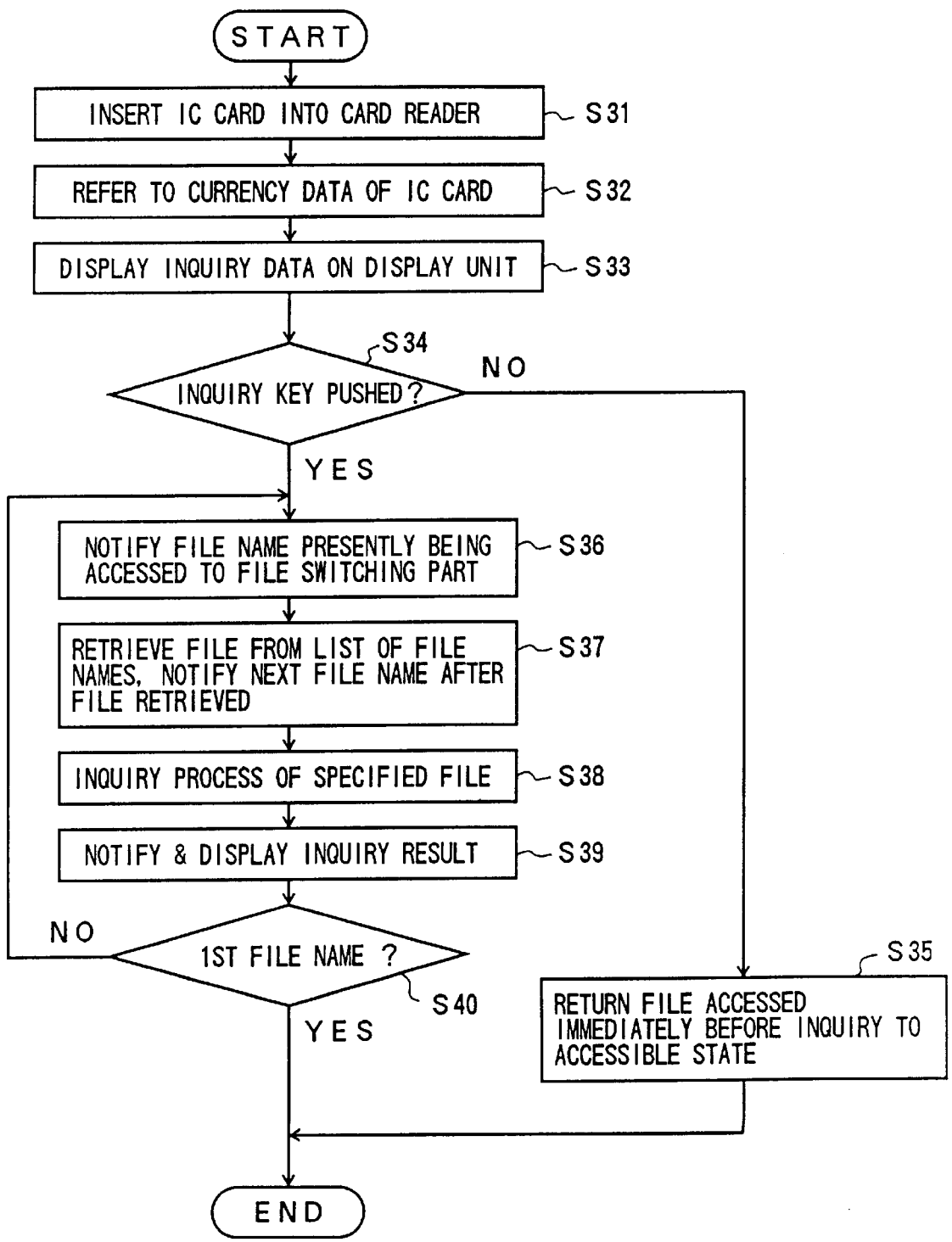
FIG. 12 is a flow chart for explaining a fourth embodiment of the file selection process.

Next, a description will be given of a fourth embodiment of the file selection process of the data processor 11, by referring to FIG. 12. FIG. 12 is a flow chart for explaining the fourth embodiment of the file selection process.

In FIG. 12, when the IC card 2 is inserted into the card reader 1 in a step S31, a step S32 selects one file from the plurality of files stored in the IC card 2 depending on the key operation made from the input part 12 or depending on a setting which is made in advance, and makes a reference to the data of the selected file. A step S33 supplies the referred data to the display unit 10, and displays the data on the display unit 10.

A step S34 decides whether or not the inquiry key 12a of the input part 12 is pushed within a predetermined time. If the inquiry key 12a is not pushed within the predetermined time and the decision result in the step S34 is NO, a step S35 returns a file to a state accessible by the data processor 11 if an access is made to this file immediately before.

On the other hand, if the decision result in the step S34 is YES, a step S36 notifies a file name of the file which is presently being accessed to the file switching part 11a. A step S37 retrieves the file which is presently being accessed from the list of file names (or table) which is stored in the memory 18 and contains the order of the files to be accessed, and notifies to the file switching part 11a the file name of a file which is next to the retrieved file. A step S38 carries out an inquiry process with respect to the file having the file name notified to the file switching part 11a in the step S37. In addition, a step S39 supplies the data which is obtained as a result of the inquiry process of the step S37 to the display unit 10, and displays the data on the display unit 10. A step S40 decides whether or not the file name of the file to which the data being displayed belongs is a first file name, that is, the file name of the file which is accessed first, based on the history stored in the memory 18. The process returns to the step S36 if the decision result in the step S40 is NO. On the other hand, the process ends if the inquiry process with respect to all of the files ends and the decision result in the step S40 becomes YES.

Therefore, when the IC card 2 is inserted into the card reader 1, it is possible to automatically and successively display the most recent data of each of the files stored in the IC card 2.

As shown in FIG. 9, a file name and a file number are assigned to the file stored in the IC card 2. Hence, it is possible to construct the data processor 11 to display the most recent data of a corresponding file in response to a key operation corresponding to the file number. This key operation corresponding to the file number may be realized by inputting the file number from the ten-key 120 or, by pushing a predetermined key a number of times corresponding to the file number. In addition, the data processor 11 may be constructed to display on the display unit 10 not only the most recent data but also the file number of the file to which the most recent data belongs.

Figure 13:
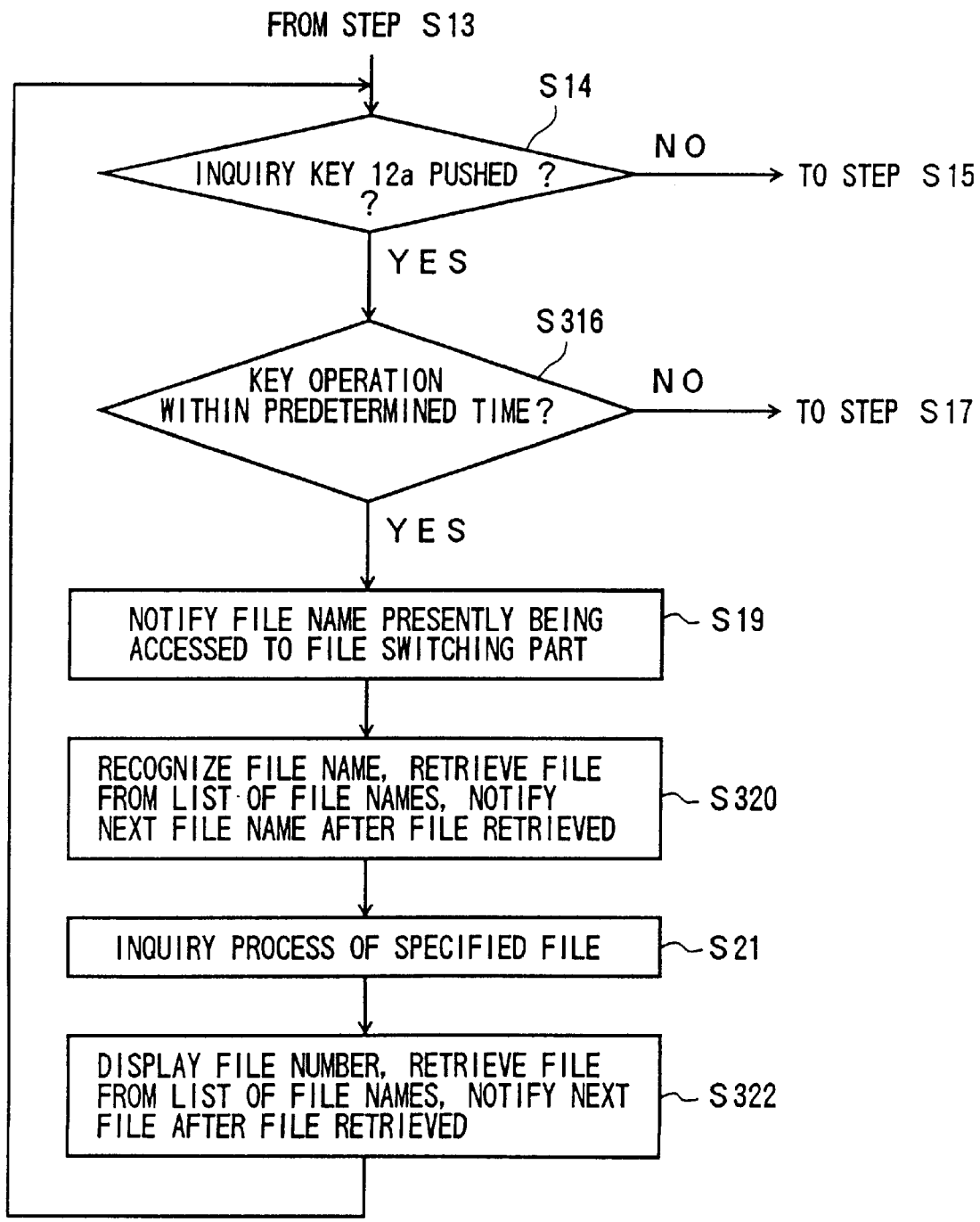
FIG. 13 is a flow chart for explaining a fifth embodiment of the file selection process.

FIG. 13 is a flow chart for explaining a fifth embodiment of the file selection process. In FIG. 13, those steps which are the same as those corresponding steps in FIG. 7 are designated by the same reference numerals, and a description thereof will be omitted. In this embodiment, when inputting the file number, a step S316 shown in FIG. 13 decides whether or not the ten-key 120 is operated within a predetermined time from the time when the IC card 2 is inserted into the card reader 1, for example. In this case, if the number "3" of the ten-key 120 is operated or, an arbitrary key of the ten-key 120 is operated 3 times, a step S320 recognizes that the file number of the next file is "3". When displaying the file number together with the data of the file, a step S322 supplies to the display unit 10 the file number of the file to which the inquiry result belongs simultaneously as when supplying the inquiry result to the display unit 10.

Of course, although a plurality of keys are provided in the embodiments described above, it is possible to provide only one key. In this case, the data processor outputs the data of the file stored in the card depending on a key operation of this one key. In other words, the card reader may be provided with one or a plurality of keys for initiating the data output operation of the data processor.

Further, the present invention is not limited to these embodiments, but various variations and modifications may be made without departing from the scope of the present invention.

What is claimed is:

1. A card reader for reading data from a card which stores data in a plurality of files, comprising:
   an input part including first and second inquiry keys; and
   a data processor for outputting data stored in the file used last out of the plurality of files stored in the card in response to operation of the first inquiry key, and for outputting data of the file successive to the file used last in response to operation of the second inquiry key.

2. The card reader as claimed in claim 1,
   wherein said input part further includes a key pad;
   wherein each of the plurality of files has a file number, and
   wherein said data processor outputs the data of the file having the file number corresponding to a number entered on the key pad.

3. The card reader as claimed in claim 2, wherein said data processor outputs together with the data the file number of the file to which the data belongs.

4. The card reader as claimed in claim 1, which further comprises:
   a display unit displaying the data output from said data processor.

5. The card reader as claimed in claim 1, wherein the card comprises an integrated circuit (IC) card having a processor and a memory storing the files.

6. The card reader as claimed in claim 1, wherein at least one of the files comprises an electronic money file including currency data.

7. A card reader for reading data from a card which stores data in a plurality of files, comprising:
   first and second keys;
   a data processor accessing one of the plurality of files stored in the card, and reading data from the file which is accessed; and
   a display displaying the data read by the data processor from the card,
   wherein the data processor accesses the file used last out of the plurality of files stored in the card when the first key is operated and switches the file with a successive file in the plurality of files stored in the card to be accessed when the second key is operated.

8. The card reader as claimed in claim 7, which further comprises:
   a table which stores an order of the files to be accessed, wherein the data processor retrieves the table to determine the file to be accessed when the key is operated.

9. A card reader for reading data from a card, comprising:
   a slot in which a card is to be inserted;
   a single inquiry key;
   a data processor accessing a file of the inserted card and reading the data stored in the accessed file; and
   a display displaying the read data,
   wherein said data processor switches to access another file of the card each time said inquiry key is depressed.

10. A card reader for reading data from a card having a plurality of data files, comprising:
    an inquiry key; and
    a data processor accessing a first of the plurality of data files of the card and reading the data stored in the first accessed file, said data processor switching to a successive one of the plurality of data files when said inquiry key is depressed, and terminating the switching of files when returning to the first accessed file.

11. A card reader for reading data from a card having a plurality of data files, comprising:
    an inquiry key; and
    a data processor accessing one of the plurality of data files of the card and reading the data stored in the accessed file when said inquiry key is depressed once, said data processor switching to a successive one of the plurality of data files when said inquiry key is successively depressed.

12. A card reader for reading data from a card having a plurality of data files, comprising:

an inquiry key; and a data processor accessing one of the plurality of data files of the card and reading the data stored in the accessed file when said inquiry key is depressed for a period of time shorter than a predetermined time, said data processor switching to a successive one of the plurality of data files when said inquiry key remains depressed longer than said predetermined time.

13. A card reader for reading data from a card having a plurality of data files, comprising:

an inquiry key; and a data processor accessing one of the plurality of data files of the card and reading the data stored in the accessed file when said inquiry key is depressed once within a predetermined time, said data processor switching to a successive one of the plurality of data files when said inquiry key is depressed again within said predetermined time.

14. The card reader as claimed in claim 1, wherein said input part further includes a third key;

wherein each of the plurality of files has a file number; and wherein said data processor outputs the data of the file having the file number corresponding to a number of times the third key is depressed in succession.

* * * * *